United States Patent
Pereira et al.

(10) Patent No.: US 7,490,127 B2
(45) Date of Patent: Feb. 10, 2009

(54) CONCURRENT RECIPIENT RESOLUTION AND CERTIFICATE ACQUISITION

(75) Inventors: Jorge Pereira, Seattle, WA (US); Karim Michel Batthish, Seattle, WA (US); Roy Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 10/460,965

(22) Filed: Jun. 13, 2003

(65) Prior Publication Data

US 2004/0254918 A1   Dec. 16, 2004

(51) Int. Cl.
*G06F 15/13* (2006.01)

(52) U.S. Cl. ............... 709/206; 709/201; 709/202; 709/203; 709/245; 380/258; 713/181

(58) Field of Classification Search ................ 709/201, 709/202, 203, 206, 245; 380/258; 713/181
See application file for complete search history.

(56) References Cited

U.S. PATENT DOCUMENTS

| | | | |
|---|---|---|---|
| 6,279,111 B1* | 8/2001 | Jensenworth et al. ........ 726/10 |
| 6,868,160 B1* | 3/2005 | Raji ........................... 380/30 |
| 7,010,600 B1* | 3/2006 | Prasad et al. ................ 709/225 |
| 2002/0031230 A1* | 3/2002 | Sweet et al. ................ 380/278 |
| 2003/0135628 A1* | 7/2003 | Fletcher et al. ............. 709/229 |
| 2004/0030893 A1* | 2/2004 | Karamchedu et al. ....... 713/168 |
| 2004/0128390 A1* | 7/2004 | Blakley et al. .............. 709/228 |

\* cited by examiner

*Primary Examiner*—Jinsong Hu
(74) *Attorney, Agent, or Firm*—Workman Nydegger (57) ABSTRACT

Concurrent recipient resolution and certificate acquisition. If a client-entered input data may be resolved without further client input, the server resolves the input data into a recipient entry that has an associated routing address. The server then transmits a response to the client that includes the associated full display name, routing address and certificate. If the server determines that the recipient entry cannot be resolved without further input from the client, the server identifies a number of possible recipient entries, and for each possible recipient generates a token, which is then communicated to the client. The server receives a subsequent request from the client identifying a selected one of the possible associated recipients using the associated token. The server then acquires a certificate associated with the selected recipient using the token, and then sends the certificate to the client.

21 Claims, 5 Drawing Sheets

CONCURRENT RECIPIENT RESOLUTION AND CERTIFICATE ACQUISITION

BACKGROUND OF THE INVENTION

1. The Field of the Invention

The present invention relates to networking technology. More specifically, the present invention relates to the concurrent resolution and certificate acquisition for a given recipient.

2. Background and Related Art

Computing and networking technology has transformed the way we work and play. Networks have become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to complete a transmission of a network message from one computing system to another, each computing system or corresponding user has an associated network or routing address. An example of a routing address is, for example, an e-mail address. In order to properly generate a network message that will be routed to the intended recipient, the network message will include the routing address corresponding to the intended recipient.

Due to the widespread interconnection of computing system and possibilities for their associated users to communicate, a user will often need assistance in order to find a routing address needed to deliver a network message to a desired recipient. One conventional help is to have display names associated with recipients. A display name may generally include text characters in any desired order, while a network address has text characters that tend to have a more restricted order. Accordingly, the display name may be expressed in a manner that is more intuitive to a human being. The user may select the display name as the intended recipient, while the network communication software automatically constructs the network message with the associated routing address.

Even with the use of display names, however, the user may still have difficulty finding a recipient. For example, in large organizations or personal contact lists, there may be multiple people with the same name. The display name may thus be similar for each of these various potential recipients. In order to find the appropriate recipients, many network communication packages incorporate ambiguous name resolution technology. This allows a user to enter a name that is different than, but is close to, the display name of the desired recipient. The user may then indicate that ambiguous name resolution is desired by, for example, selecting a "resolve names" function. The client then may search a local recipient database for recipient entries having similar corresponding display names. The user then selects the correct one of the resulting recipient entries. The associated routing address is then used as the destination address in the network message.

Alternatively, the client may transmit a resolution request to a server with the associated name to be resolved into a recipient entry. The server may search through an organizational or personal database to find one or more possible associated recipient entries. If only one possible associated recipient entry is found, the name is resolved, and the server downloads the associated recipient information (e.g., display name and/or routing address) to the client. If multiple possible associated recipient entries are found, then the server provides the potential matches to the client and allows the client to select which of the possible recipient entries is desired.

Over and above recipient resolution, it is sometimes desirable to ensure that the network message is transmitted in a secure fashion to the associated recipient. One way of securing the network message is to encrypt some or all of its contents. A computing system may use a certificate corresponding to the destination address to be sure the computing system encrypts the network message in a manner that may be decrypted at the destination computing system. Accordingly, the certificate corresponding to the destination computing system includes encryption information. In addition, the certificate includes validation information to allow the source computing system to determine that the certificate does indeed correspond to the destination computing system, and that the certificate has not expired and has not been revoked.

Conventionally, the recipient resolution and certificate acquisition operations are separate and distinct. Each is performed independently of the other. Nevertheless, what would be advantageous is a mechanism in which recipient resolution and certificate acquisition are performed in a manner that reduces network bandwidth and processor workload requirements.

BRIEF SUMMARY OF THE INVENTION

The foregoing problems with the prior state of the art are overcome by the principles of the present invention which are directed towards a mechanism in which recipient resolution for a recipient and certificate acquisition for the resolved recipient are accomplished concurrently. The concurrent operation reduces network bandwidth and processing requirements as compared to separately performing recipient resolution and certificate acquisition. The mechanism is performed by a server computing system that is in communication with a client computing system.

A user of the client computing system enters input resolution data that the server computing system may use to search for recipient entries for which resolution is desired, and for which a certificate is needed. The input resolution data may be, for example, a string that represents all or a portion of the display name, alias, or a routing address associated with the desired recipient entry. The recipient resolution is needed to access the recipient entry corresponding to the desired recipient, while the certificate is needed in order to encrypt a network message destined for that recipient. The client computing system transmits a request to resolve the input resolution data into an associated recipient entry to the server computing system.

If the input resolution data may be resolved without further client input, the server computing system resolves the input resolution data into a recipient entry. The server computing system then generates a response to the request. The response includes the associated routing address and includes at least one certificate corresponding to the associated routing address. The server computing system then transmits the response to the client computing system.

Accordingly, when the recipient entry may be resolved from the input resolution data within the original request, the response may include all the information needed for the client to both resolve the name into an appropriate recipient, and also acquire the certificate corresponding to the resolved recipient entry, all in a single round trip request/response interchange with the server computing system. The client computing system may then send a secure network message to the destination computing system of the resolved recipient.

If the server determines that the input resolution data cannot be resolved into a single associated recipient entry without further input from the client computing system, the server computing system identifies a number of possible associated recipient entries. For some or all of the possible associated recipient entries, the server computing system generates a token that uniquely identifies the possible associated recipient entry. The server computing system then communicates any generated tokens to the client computing system along with potentially information from the recipient entry such as display name or routing address. The server receives a subsequent request from the client computing system identifying a selected one of the possible associated recipient entries using at least part of the token associated with the selected recipient entry. In response, the server computing system acquires a certificate associated with the selected recipient entry using information from the portion of the token supplied. The server computing system then sends the certificate to the client computing system.

Accordingly, the server computing system may both resolve the recipient and provide the associate certificate with a small number of round trip request/response interchanges between the client computing system and the server computing system, even if the client computing system did not provide sufficient input resolution data to immediately resolve the recipient entry in the original request. In this manner, network traffic and client and server workload may be reduced. The use of the token also reduces processing workload as the token may be structured in such a way that the associated recipient entry may be immediately found using the token.

In one aspect of the present invention, the server computing system prompts the client computing system after the server computing system determines that immediate resolution is not possible without further client input. The client computing system may then indicate whether any further efforts should be undertaken to resolve the recipient. If the client computing system indicates that further actions are to be taken to complete the resolution, then the server computing system transmits the possible associated recipient entries with any generated tokens to the client computing system. Accordingly, if the client computing system indicates that further actions to accomplish resolution are not required, the server computing system may avoid the processing resources associated with finding possible associated recipient entries and generating corresponding tokens.

If the input resolution data is resolved to a distribution list, then the server computing system may expand the distribution list to its included member recipients, and obtain certificates for those corresponding member recipients. In one embodiment in which the identity of the member recipients are to be concealed, a single certificate may be provided for the entire distribution list. The certificate may be used to encrypt the network message so as to be decryptable by a mailing list agent. Upon receipt of the encrypted network message, the mailing list agent decrypts the network message, expands the distribution list, re-encrypts the network message so as to be decryptable by each of the members of the distribution list, and then forward the network message to the various members. Accordingly, the principles of the present invention may be implemented even for distribution lists for which the various member recipients are hidden from the client computing system.

The original request from the client computing system to the server computing system may include input data for multiple recipient entries to be resolved and for which a certificate is desired. For those recipient entries that may be resolved immediately, the certificate is provided in the response to the request as described above. Otherwise, for those recipient entries that cannot be resolved immediately, the server computing system provides the possible associated recipient entries to the client computing system as described above. The client computing system then selects one of the possible corresponding recipient entries, whereupon the server provides the appropriate certificate.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms in which ambiguous name resolution for a recipient entry and certificate acquisition for the resolved recipient entry are accomplished concurrently. A user of the client computing system enters input resolution data for which resolution is desired, and for which a certificate is needed. The input resolution data may be, for example, all or part of a display name, alias, routing address or other property of the recipient entry. The client computing system transmits a request to resolve the input resolution data into an associated recipient entry to the server computing system.

If the input resolution data may be resolved without further client input, the server computing system resolves the input resolution data into a recipient entry. The server computing system then generates a response to the request. The response includes information from the recipient entry including, for example, the associated routing address and full display name, and also includes at least one certificate corresponding to the associated routing address. The server computing system then transmits the response to the client computing system.

If the server determines that the input resolution data cannot be resolved into a single recipient entry without further input from the client computing system, the server computing system identifies information (e.g., routing address and display name) associated with a number of possible associated recipient entries, and generates a token that uniquely identifies the possible associated recipient entry for each of at least some of the possible associated recipient entries. The server computing system then communicates the generated tokens to the client computing system along with potentially also information (e.g., routing address and display name) associated with possible associated recipient entries. The server receives a subsequent request from the client computing system identifying a selected one of the possible recipient entries using at least part of the token associated with the selected recipient entry. In response, the server computing system acquires a certificate associated with the selected recipient entry using information from the at least part of the token. The server computing system then sends the certificate to the client computing system.

Embodiments within the scope of the present invention include computer-readable media for carrying or having computer-executable instructions or data structures stored thereon. Computer-readable storage media can be any available media which can be accessed by a general purpose or special purpose computer. By way of example, and not limitation, such computer-readable storage media can comprise physical computer-readable media such as RAM, ROM, EEPROM, CD-ROM or other optical disk storage, magnetic disk storage or other magnetic storage devices, or any other medium which can store desired program code in the form of computer-executable instructions which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable transmission medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
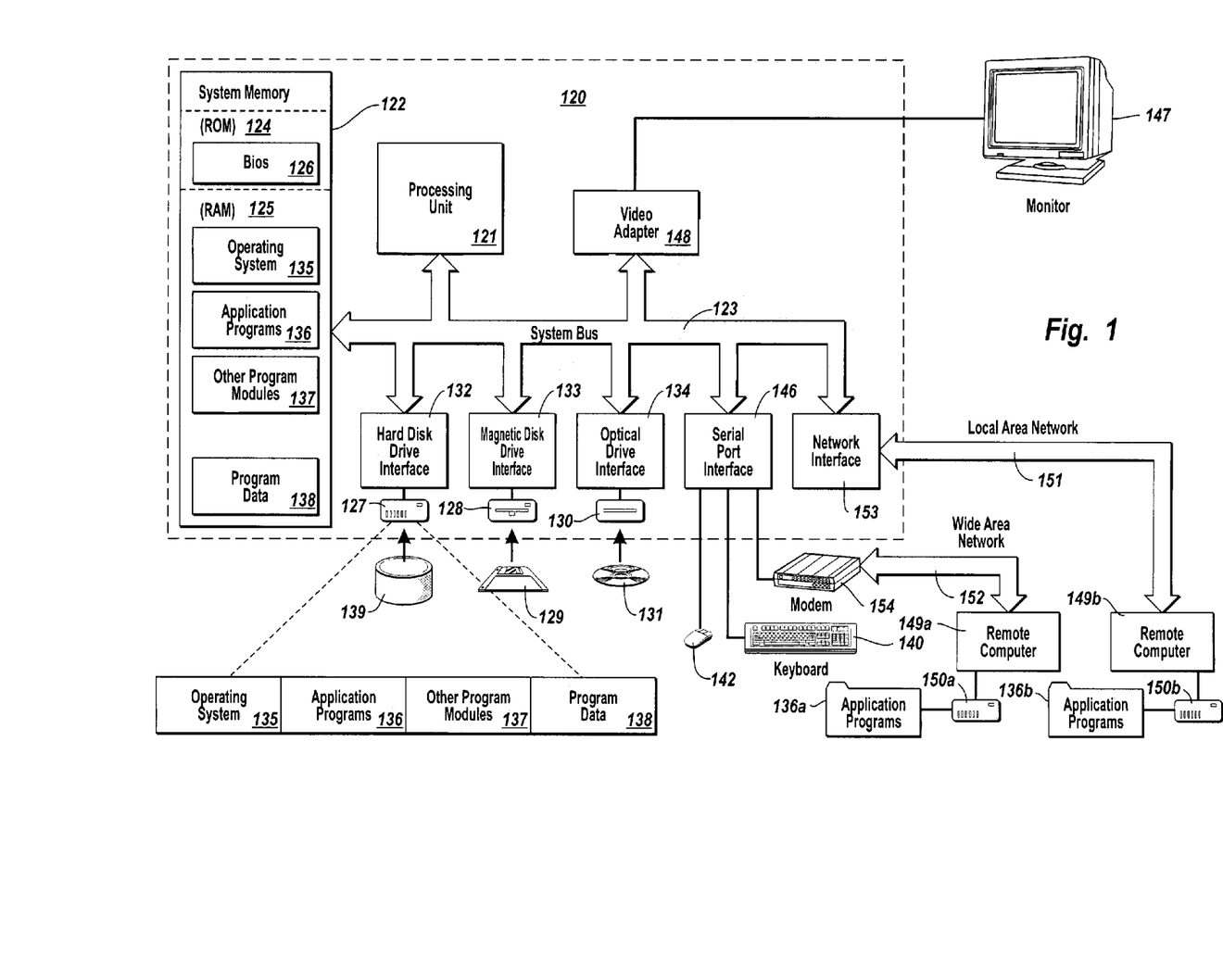
FIG. 1 illustrates a suitable computing system that may implement that features of the present invention.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any computing system that is capable of sending network messages and otherwise performing the principles of the present invention. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
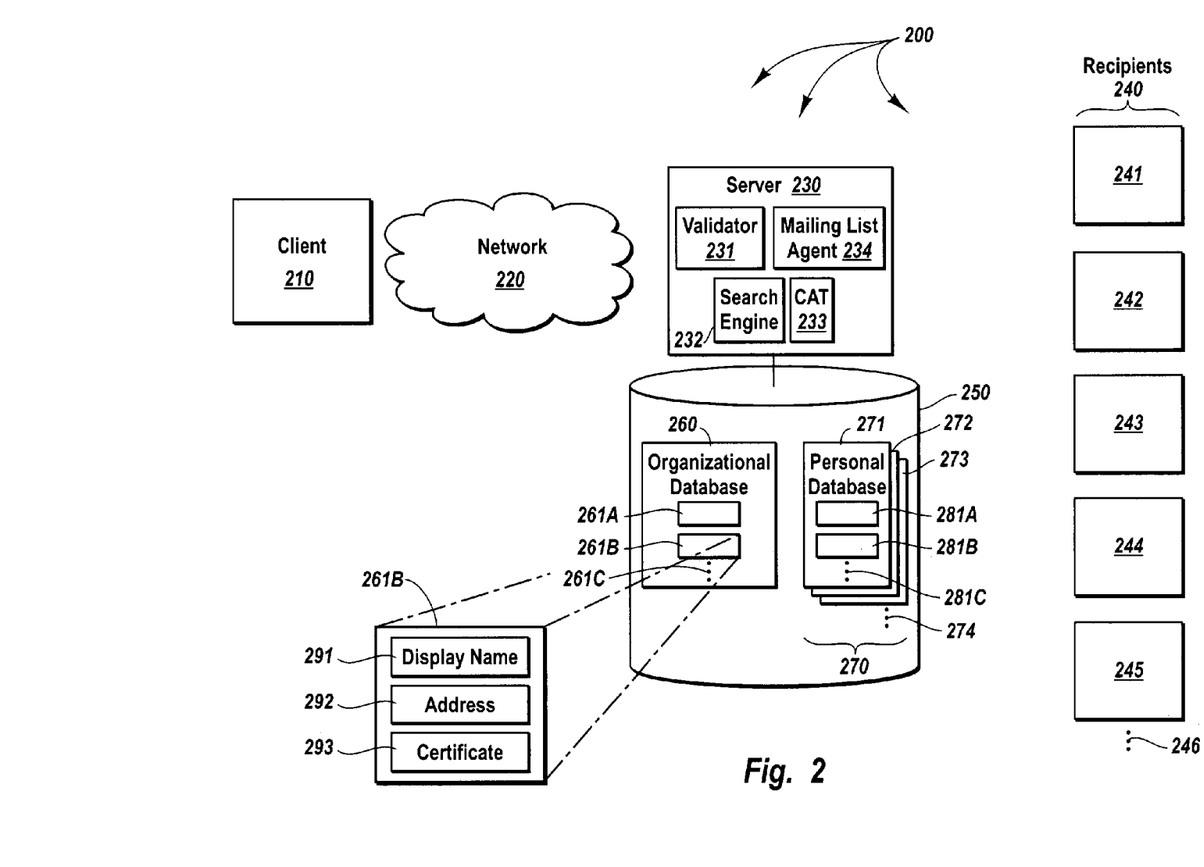
FIG. 2 illustrates a network environment in which the principles of the present invention may be employed.

FIG. 2 illustrates a network environment 200 in which the principles of the present invention may be employed. The network environment 200 includes a client computing system 210 that is to generate or access a network message for ultimate delivery to one of the recipient computing systems 240. The principles of the present invention are not restricted to the number of potential recipients with whom the client computing system 210 may communicate. In a larger network environment such as a corporate intranet or the Internet, there may be many potential recipients for with whom the client computing system 210 may communicate. However, in the illustrated embodiment, five potential recipient computing systems 241 through 245 are shown. There may be many more as represented by the vertical ellipses 246.

The client computing system 210 communicates with a server computing system 230 over a network 220. The network 220 may be any network such as a personal or corporate intranet or even the Internet. The network 220 may even be dynamically changing as when the client computing system 210 is mobile. Preferably, the network 220 is secure although this is not strictly required. The client computing system 210, the server computing system 230 and the recipient computing systems 240 may be any computing system that is capable of communicating over a network. Computer 120 is just one of any number of such computing systems.

Although the client computing system 210 is identified as being a "client" and the server computing system 230 is identified as being a "server", a client in one context may be a server in another. Accordingly, the use of the term "client" for client computing system 210 should not be construed to mean that the client computing system 210 does not act as a server in other contexts. Likewise, the use of the term "server" for server computing system 230 should not be constructed to mean that the server computing system 230 does not act as a client in other contexts.

The remaining features of the network environment 200 will be described with frequent reference to FIG. 3, which illustrates a method 300 for the server computing system 230 to concurrently perform recipient resolution and certificate acquisition for the resolved recipient entry. As previously mentioned, recipient resolution is a tool that assists users in finding a recipient entry and associated information such as, for example, associated display name and routing address. Recipient resolution is particularly useful when drafting a network message in an environment in which there may be many potential recipients with whom a client may communicate. Certificate acquisition allows the client computing system to encrypt a network message in a fashion that may be decrypted by the intended recipient computing system, but not generally by other computing systems.

Figure 3:
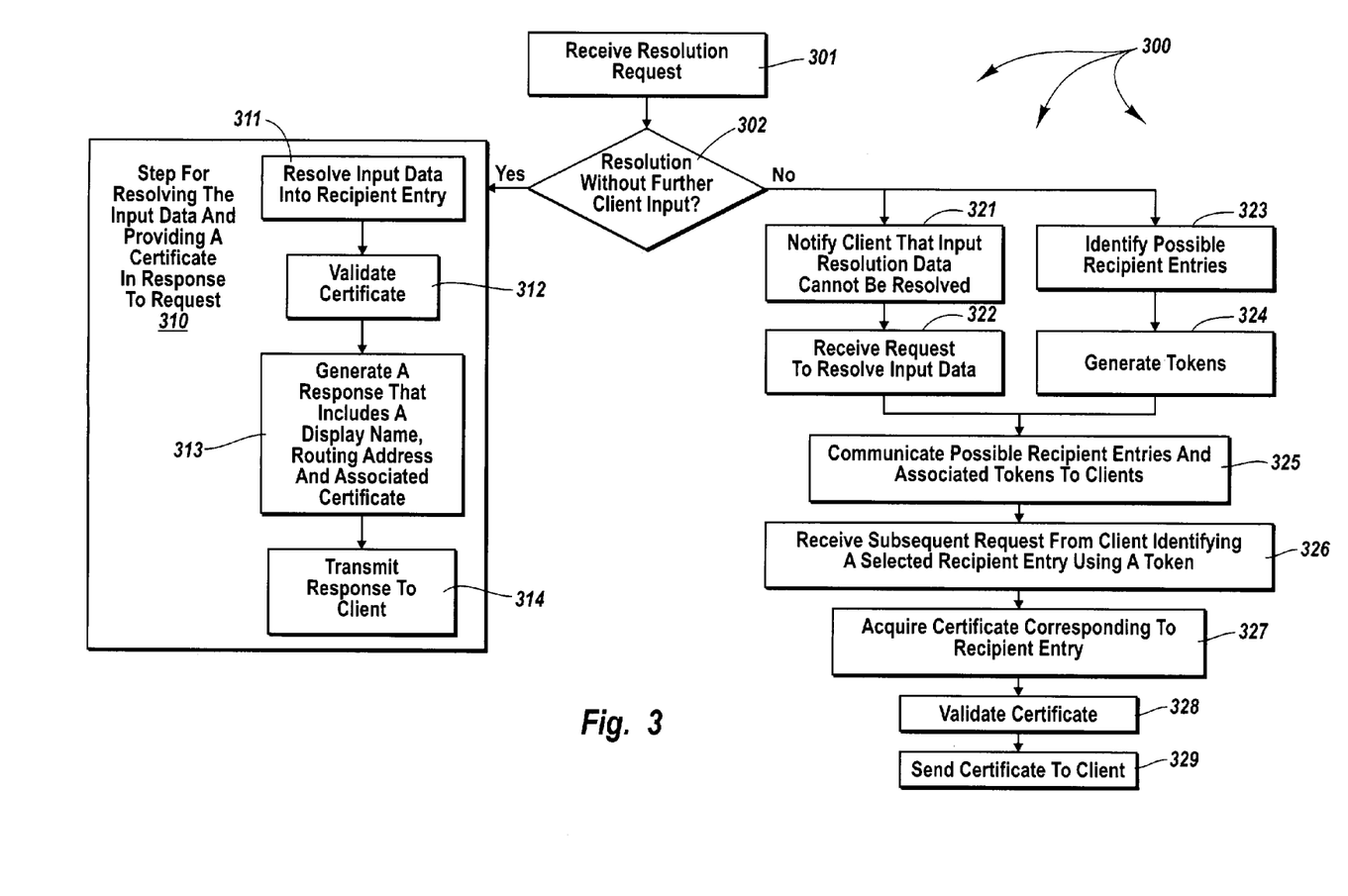
FIG. 3 illustrates a flowchart of a method for the server computing system to concurrently perform recipient resolution for a recipient entry and certificate acquisition for the resolved recipient entry.
Figure 4:
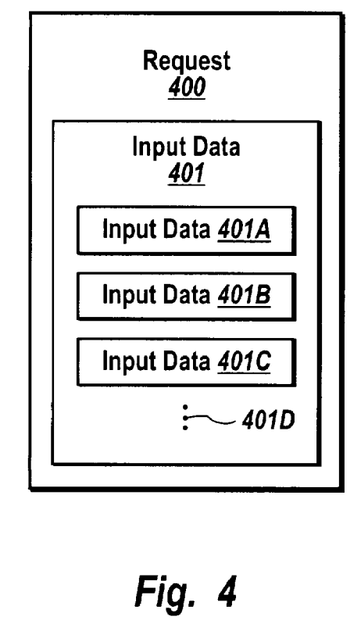
FIG. 4 illustrates a data structure of a request to perform recipient resolution.

Referring to FIG. 3, the server computing system 230 receives a request from the client computing system to resolve an input resolution data into an associated entry (act 301). FIG. 4 illustrates a schematic data structure of such a request 400. The request 400 includes a listing input data 401 for one or more recipients that are to be resolved. For example, the illustrated input data 401 includes input data 401A for resolving into one recipient entry, input data 401B for resolving into another recipient entry, input data 401C for resolving into yet another recipient entry among potentially much more input data for resolving into other recipient entries as represented by the vertical ellipses 401D. Each recipient entry may correspond to a distribution list, or a single user or other entity. There may be a single name in the request, or multiple names. A distribution list is a recipient entry that encapsulates a group of recipients and may have its own routing address. The distribution list thus includes a number of member elements corresponding to each of these multiple recipients. The distribution list may have multiple tiers of structure as when a distribution list is a member of another distribution list. Example display names for distribution lists include, for example, "All Users", "My Bowling Buddies", "Human Resources" or the like.

In one embodiment, the request 400 may be a HyperText Transport Protocol (HTTP) request such as, for example, an HTTP POST request. In that case, if input data associated with a single recipient entry is to be resolved, then the HTTP POST request may include a ResolveOneRecipient method in the HTTP header information. If multiple names are to be resolved, then the HTTP POST request may include a ResolveRecipients method. The server may then interpret the method and determine that recipient resolution is desired. Other transport protocols and methods may also be used to deliver and represent the request.

Once the server computing system 230 receives the request (act 301), the method takes a different path depending one whether the input resolution data can be resolved into a single associated recipient entry without further input from the client computing system (decision block 302).

If the input resolution data can be resolved without further client input (Yes in decision block 302), then the method 300 proceeds to a step for resolving the name and providing a certificate in response to the single request (step 310). This step may include any corresponding acts for accomplishing this result. However, in the illustrated embodiment, the step include corresponding acts 311, 313 and 314 and potentially corresponding act 312.

Specifically, the server computing system resolves the input resolution data into a recipient entry (act 311). Resolution may occur by placing queries to database 250. Each recipient entry in the database (e.g., recipient entry 261B) includes information associated with the recipient such as, for example, a display name (e.g., display name 291), a routing address (e.g., address 292) and one or more certificates (e.g., certificate 293). Each recipient entry corresponding to a particular recipient and routing address for reaching that recipient.

In one embodiment, the database 250 includes an organizational database 260 that is maintained by an organization. An example of an organizational database is a MICROSOFT® ACTIVE DIRECTORY®. Typically, access privileges for adding, editing, and deleting entries in the organizational database reside with agents of the organization such as, for example, system administrators. The organizational database 260 is illustrated as including entries 261A and 261B among many more as represented by the vertical ellipses 261C.

The database 250 may also include a number of personal databases 270 including personal database 271, personal database 272, personal database 273, among potentially many more as represented by the vertical ellipses 274. Each personal database may be maintained by a corresponding user. For example, the personal database may be a user's contact list and will also contain recipient entries. For example, the personal database 271 includes recipient entries 281A and 281B among potentially many more as represented by the vertical ellipses 281C. The personal database 271 will be assumed to be the personal database that corresponds to the client computing system 210 or its corresponding user making the request received in act 301.

Figure 5:
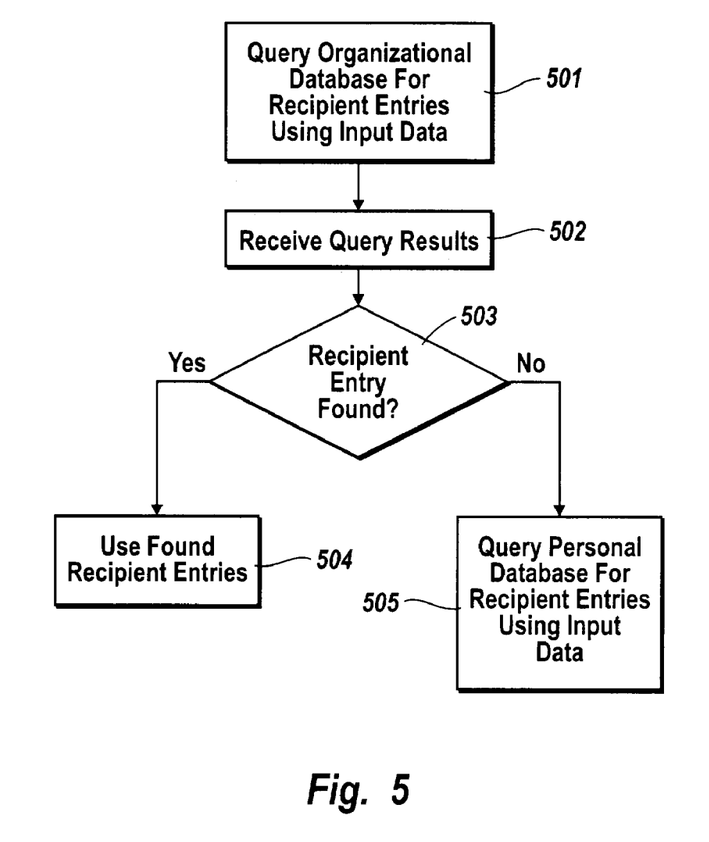
FIG. 5 illustrates a flowchart of a method for resolving input resolution data into a recipient entry using both an organizational database and a personal database.

Returning to FIG. 3, the server computing system resolves the input resolution data (act 311) into an associated recipient entry. The principles of the present invention are not limited to the precise resolution mechanism. However, in the illustrated embodiment, the resolution occurs using search engine 232. FIG. 5 illustrates a flowchart of a method 500 that may be used by the search engine 232 to resolve in the context of the organizational database 260 and the personal database 271.

As represented in FIG. 5, the search engine 232 first queries the organizational database for recipient entries using the input resolution data (act 501), and then receives the results of the query (act 502). When querying an organization database such as a MICROSOFT® ACTIVE DIRECTORY®, Directory Access Protocol (DAP), or Light-weight DAP (LDAP) may be used. The search engine 232 then determines whether a recipient entry was found as a result of the query (decision block 503). If a matching recipient entry is found in the organizational database (Yes in decision block 503), then the matching display name may be used as the resolved recipient entry corresponding to the input resolution data (act 504). If a matching recipient entry is not found in the organizational database (No in decision block 503), then the search engine queries another database such as a personal database (act 505) for recipient entries using the input resolution data (act 505). Any found matching recipient entry may then be used as the resolved recipient entry.

If further databases are available, then those databases may be searched as well. Alternatively, the personal database 271 may be searched prior to the organizational database 260, or perhaps both databases 260 and 271 could be queried in parallel.

The step 310 optionally includes a corresponding act of validating one or more certificates that correspond to the matching recipient entry (act 312). This validation may be accomplished by, for example, the validator 231 of the server computing system 230. The certificate may be, for example, an X.509 certificate. Validation involves 1) checking the certificate to be sure that the certificate in fact does correspond to the recipient represented in the recipient entry, 2) checking to be sure the certificate has not expired, and 3) checking to be sure the certificate has not been revoked. The validation information may also facilitate a determination of whether or not the certificate is trusted, and whether the certificate is good for encrypting e-mail.

The X.509 certificate may be encoded as appropriate for the corresponding database. The certificate includes encryption information that may be used to encrypt the network message. The encryption information may include, for example, a public key that may be used to encrypt in a fashion that may be decrypted by the recipient. The certificate also includes validation information that allows validation as described above to be performed.

Figure 6:
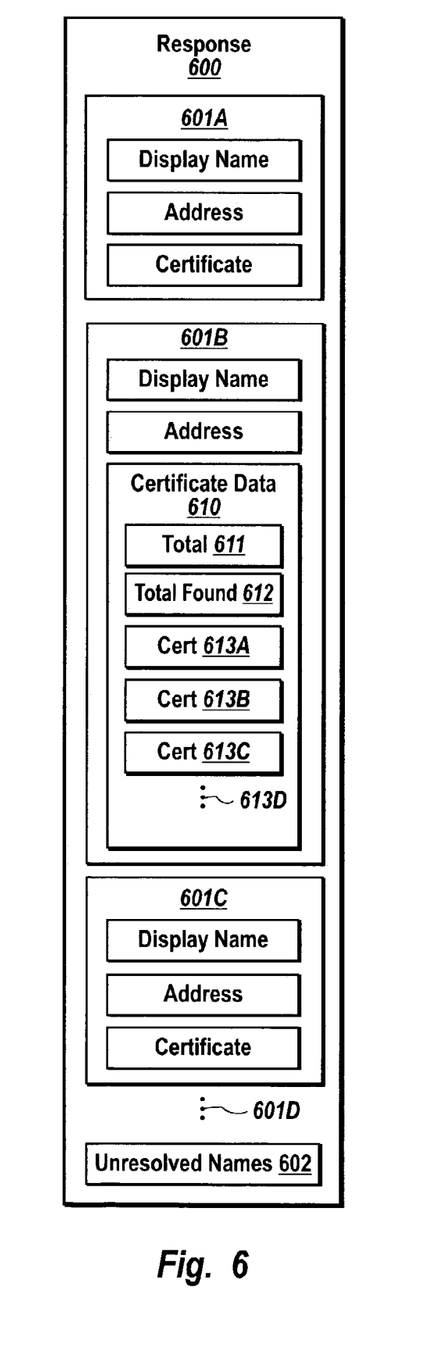
FIG. 6 illustrates a data structure of a response to the request of FIG. 4.

The server computing system then generates a response to the request (act 313). FIG. 6 illustrates a data structure of a response 600 to the request. The response 600 includes resolution data fields 601, one for each name in the request that was able to be resolved. Each resolution data field 601 includes, for example, the display name corresponding to the recipient entry that the input resolution data was resolved into, a corresponding routing address field, and a corresponding one or more certificates.

The certificates may be the full version of the certificate. Alternatively, the certificate may be a subset or "mini-certificate" of the certificate as a whole in which the validation information from the certificate is stripped. As described in the commonly-assigned, co-pending United States patent application referenced below, mini-certificates may be transmitted from a trusted server to a client, instead of the full version of the certificate when the server performs validation of the certificate. Transmitting the mini-certificate, rather than the full certificate, reduces the network bandwidth used to transmit the certificate. More regarding mini-certificates are described in co-pending, commonly-assigned, U.S. patent application Ser. No._____, entitled "System and Method for Transmitting Reduced Information from a Certificate to Perform Encryption Operations", filed on the same day herewith.

If the resolved recipient entry corresponds to a single non-expandable entity (e.g., a user, person, or hidden distribution list whose member elements are not allowed to be expanded), then the resolution data field includes a single certificate. For example, suppose that the resolution data field 601A includes a display name and routing address that correspond to a single non-expandable entity. The resolution data field would include a corresponding single certificate. Likewise, the resolution data field 601C includes a display name and routing address that correspond to a single non-expandable entity, along with a corresponding single certificate.

Although multiple certificates may correspond to the non-expandable recipient described by the display name in the resolution data fields 601A and 601C, only one certificate is returned in the case of a non-expandable recipient (e.g., a user, person, or hidden distribution list). For example, in addition to a valid certificate, there may be expired or revoked certificates in the database entry as well. However, only one certificate is returned for a given non-expandable recipient entry since validation is performed to remove the other certificates from consideration. Accordingly, there is no requirement to ensure that the database only holds one certificate per recipient entry, as only one certificate (at most) will be returned for any corresponding non-expandable recipient entry.

Suppose that the resolution data field 601C corresponds to a non-expandable distribution list. Often, for security reasons, even if it is acceptable for an individual to send a message to each member in a distribution list, it is sometimes desirable to conceal the identity of each member of the distribution list. Such distribution lists are often termed as "hidden" distribution lists. Hidden distribution lists are non-expandable to the entity that it is hidden from.

In order to facilitate the principles of the present invention even for recipient entries that correspond to a hidden distribution list, a mailing list agent 234 may be used. The single certificate for the hidden distribution list corresponds to the mailing list agent 234. As the encrypted network message travels through the mailing list agent 234, the mailing list agent uses its private key to decrypt the network address, expands the distribution list, acquires the certificate for each member element, and then re-encrypts the network message for the destination recipients.

The resolution data field 601B includes a display name that corresponds to a non-hidden and expandable distribution list. The certificate data 610 may include a total count data field 611 that represents the total number of member recipients of the corresponding distribution list, a total found data field 612 indicating how many of the member recipients have corresponding valid certificates contained in the certificate data field 610, and a number of certificates represented by certificate 613A, 613B, 613C, among potentially many more as represented by the vertical ellipses 613D.

The categorizer 233 expands the distribution list into member elements, acquires certificates for those member elements, and provides the certificates to the validator 231 for validation. The categorizer 233 does this by querying the database 250 for the member elements of the distribution list. If the class type for the member element is other than an expandable distribution list (e.g., is a user, a person, or a hidden distribution list), then the member elements are added to a local list of member elements at the server computing system. If the class type for the member element is a distribution list, then the corresponding member list for that member element is queried, and so on, and so forth, until the entire tree for the distribution list is expanded with each branch not terminating at an expandable distribution list.

During this time, as member elements are added to the local list, or after the entire local list is compiled, the database 350 is queried for the corresponding member certificates. Alternatively, the certificates are provided with the member element list for a distribution list in response to the original member list query from the categorizer 233. The certificates are then validated. Any surviving certificates are, at this point, included in the response within the resolution data field corresponding to the distribution list.

If there is input resolution data in the original request that did not result in a resolved recipient entry, the response may include an unresolved data field 602. The unresolved data field 602 identifies each input data entry for which resolution was not accomplished (resulting from act 321 described below if optional acts 321 and 322 are performed). If the resolution process resulted in no matching recipient entries, then the resolution is not possible using that the corresponding data resolution input, and the user will not be able to send a network message to the desired recipient without supplementing the input resolution data. Alternatively, if the resolution process resulted in multiple possible recipient entries for a given input resolution data entry, the unresolved data field 602 includes for the given entry, a plurality of possible display names, routing addresses and corresponding tokens (resulting from act 325 described below if optional acts 321 and 322 are not performed)

If the original request received in act 301 is an HTTP request, then the response may be an HTTP response. The response data structure 600 illustrated in FIG. 6 may be an eXtensible Markup Language (XML) document included as part of the body of the HTTP response, whether directly, or indirectly by being contained in another data structure such as, for example, a Simple Object Access Protocol (SOAP) envelope that is embedded in the HTTP response. After the response is generated (act 313), the server computing system 230 then transmits the response to the client computing system 210 (act 314), thereby completing the functional, result-oriented step 310.

Once the client computing system 210 receives the response, the client computing system may encrypt and transmit the network message to all recipient computing systems 240 who were able to be resolved, and for which a valid certificate was returned. However, there are several instances in which the client computing system 210 will not, even at this stage, be able to send a useful network message. For instance, there may be cases in which a valid certificate was not found even for properly resolved recipient entries. In a second instance, there may be cases in which an input resolution data entry corresponding to a recipient remains unresolved.

If a valid certificate is not found for a particular properly resolved recipient entry, then the network message cannot be securely communicated. Accordingly, the network message is either not sent, or sent in encrypted form even though it cannot be decrypted by the recipient. In either case, the message may include a notification that a network message was either not sent or sent in undecryptable form because the recipient does not have a valid certificate. This may prompt the user of the recipient computing system to cause the recipient computing system or the user to acquire a valid certificate.

If the input resolution data entry was not able to even be resolved, then the input resolution data entry may be identified in the unresolved names data field 602 of the response 600. In that case, the name may be further resolved as described below with respect to acts 321 through 329 of FIG. 3. Alternatively, the resolution data field corresponding to a distribution list may include unresolved member display names.

Distribution lists contained in organizational data structure will typically have less likelihood of having unresolved member recipients. For example, a distribution list in a MICROSOFT® ACTIVE DIRECTORY® will have only resolved member recipients. On the contrary, personal databases such as contact lists may more often have unresolved recipients, since users are less restricted when entering new recipient entries into a personal database. Some member recipients may come from organizational database entries, while others may be other personal database entries. Accordingly, the member recipients of the resolved and expanded distribution list may need to be further resolved.

Figure 7:
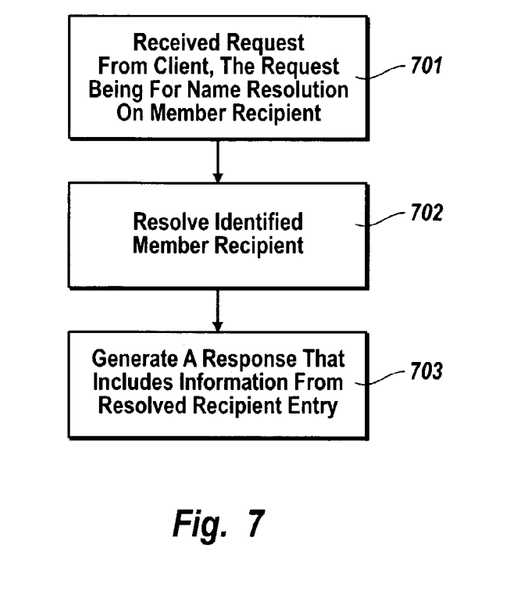
FIG. 7 illustrates a method for performing subsequent recipient resolution of a member recipient of a distribution list when the member recipient is also ambiguous.

FIG. 7 illustrates a flowchart of a method 700 for resolving member recipients of a distribution list. In particular, the client computing system generates a request to resolve the member recipient whereupon the server computing system receives the request (act 701). The server computing system then resolves the identified member recipient into a resolved recipient entry (act 702). The member recipient may be resolved in the same manner as described herein with respect to FIG. 3. The server computing system then generates a response to the request, the response including information from the resolved recipient entry (e.g., display name and routing address) (act 703).

Returning back to the decision block 302, the method 300 takes a different route if the input resolution data included in the request received in act 301 is not able to be resolved into a single recipient entry without further client input (No in decision block 302). If resolution cannot be performed, the server computing system notifies the client computing system that the input resolution data cannot be resolved (act 321). This may occur by identifying the input resolution data in the unresolved name data field 602 of the response. The client computing system may notify the user by, for example, uniquely highlighting the unresolved input resolution data. The user may then select the unresolved input resolution data or some other icon to thereby cause the client computing system to generate and transmit a second request to resolve the name. The request is then received by the server computing system (act 322).

In addition and potentially in parallel, the server computing system identifies a plurality of possible recipient entries associated with the input resolution data (act 323). This may be accomplished using any database querying mechanism in which close matches may be found based on search terms in the query. One example is illustrated and described above with respect to FIG. 5.

Figure 8:
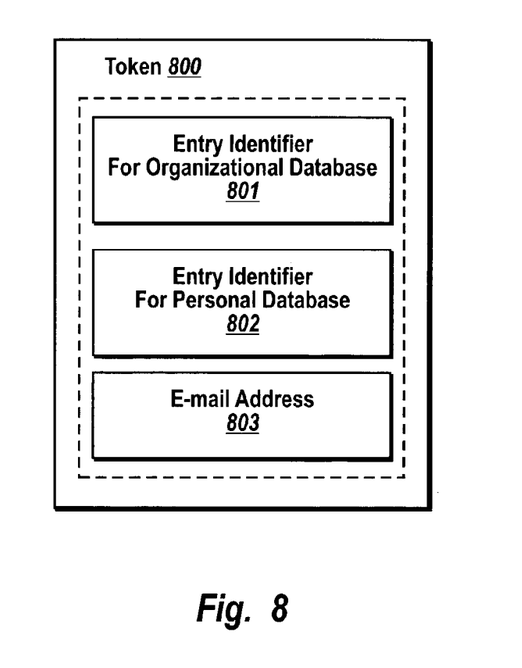
FIG. 8 illustrates a data structure of a token that may be used to uniquely identify a possible associated recipient entry

For each of at least some of the possible recipient entries discovered in act 323, the server computing system generating a token that uniquely identifies each (act 324). FIG. 8 illustrates a data structure of such a token 800. The token 800 contains three potential alternative data fields 801 through 803. The alternative inclusion of one of the three alternative data fields 801 through 803 is represented by the data fields 801 through 803 being encased by a dashed border.

For instance, data field 801 includes an identifier that uniquely identifies a recipient entry in the organizational database 260. If the organizational database 260 was a MICROSOFT® ACTIVE DIRECTORY®, then the identifier may be, for example, a MICROSOFT® Exchange Distinguished name. Data field 802 includes an identifier that uniquely identifies a recipient entry in the personal database 271. If the personal database 271 was a contacts list, the identifier may be, for example, an entry ID. If the recipient entry is in the organizational database 260, the data field 801 may be present in the token. If the recipient entry is in the personal database 271, the data field 802 may alternatively be present. The data field 803 includes an e-mail address associated with a corresponding display name.

The aim of the token is to uniquely identify where the recipient entry came from so that the corresponding certificate may be quickly found when the token is provided back to the server computing system. For example, the token may define where the recipient entry came from (e.g., from the personal or organizational database). However, sometimes unique identification may not be possible. For example, the use of an e-mail address in data field 803 may not always uniquely identify the recipient entry. For example, a recipient may have an entry in both the personal and organizational databases, each with the same e-mail address. Accordingly, the e-mail address alone will not uniquely identify which recipient entry the user desires in this case. On the other hand, if the recipient was only entered in one of the databases, the e-mail address would suffice to uniquely identify the entry and where the recipient entry came from.

Once the server computing system has received the second request to resolve the input resolution data (in act 322) and has generated the tokens (in act 324), the server computing system communicates the information (e.g., display name and routing address) from the possible recipient entries and any generated tokens to the client computing system (act 325). Upon receiving the possible recipient entries, the user of the client computing system selects one of the possible recipient entries for any given unresolved input resolution data. In response, the client computing system then generates a subsequent request identifying the selected recipient. The request identifies the selected recipient entry using at least part of the associated token. The request is then received by the server computing system (act 326).

In response to this request, the server computing system acquires the certificate associated with the selected recipient entry using the token information (act 327). The server computing system then validates the certificate (act 328), and sends the certificate to the client computing system (act 329). Once again, the certificate may be a smaller version of the certificate without validation information if the server computing system 230 is trusted by the client computing system 210.

Additional data for the recipient entry may also be sent with the certificate (e.g. the e-mail address, so the client can send e-mail to the recipient). This depends on what has already occurred. For instance, if the user desires to send an e-mail for which the recipient had been previously resolved (as might be the case if resolution is performed before shutting down the client and thereby losing all resolution information except for an e-mail address token saved with the e-mail draft) then only the certificate will be returned. In another scenario, resolution had not been previously performed (as when composing a new email and only newly entering the recipients). In that case, more complete data for the recipient (e.g., network address and display name) may be sent with the certificate.

The principles of the present invention have a number of advantages.

First, when resolution can occur using the information originally provided in the first request, the corresponding certificate is acquired at the same time thereby reducing network traffic to a single request and response round trip. This is especially useful when the network 220 between the server computing system 230 and the client computing system 210 has more limited bandwidth.

Second, certificate acquisition is performed concurrently with recipient resolution. Accordingly, even when the name cannot be immediately resolved, network traffic is reduced as compared to separately performing recipient resolution and certificate acquisition.

Third, validation may be performed at the server computing system rather than at the client computing system, thereby alleviating the client computing system from the processing burden involved with validation. Furthermore, this server validation reduces the chance that network bandwidth will be wasted delivering invalid certificates from the server computing system to the client computing system. If a certificate is delivered, it will be valid and therefore more likely useful. If the server computing system is trusted to the client computing system, then this server validation means that the entire certificate need not be transmitted to the client. Instead, a mini-version of the certificate with the validation information stripped may be delivered. This further preserves network bandwidth.

Fourth, the use of a token to identify a selected one of multiple possible recipients avoids the need to perform further resolution of that recipient. Instead, the identifier included within the token may be used to directly access the appropriate entry in the appropriate database. The structure of the identifier itself may identify whether the organizational database should be queried, or whether the personal database should be queried. The identifier may then be directly used in the query. Accordingly, the use of the token that uniquely identifies the entry corresponding to the recipient entry allows for more efficient access of a selected recipient entry.

Fifth, the notification and second request described above with respect to acts 321 and 322 gives the client computing system or its user the opportunity to approve whether or not recipient resolution should be accomplished for given input resolution data. This could lead to processing and network bandwidth efficiencies. For example, suppose that the user selects a very short name or incompletely typed name that would have enormous numbers of possible matches. The client computing system may reject the resolution process, and then retype a longer more descriptive or complete name thereby likely reducing the processing required to perform an extensive database search which will result in many potential matches. Acts 321 and 322 are optional, but they do provide this advantage.

Sixth, the principles of the present invention may support network message drafts. When a network message is drafted and saved, any corresponding downloaded certificates may not also-be saved. Certificates that are to be used to encrypt a network message such as an e-mail are typically not saved with the network message. When the network message is reopened, the messaging program may automatically request certificates for any resolved recipient entries, and request resolution for any unresolved input resolution data entries in the same manner as described above. In this case, if the network message was an e-mail address, the e-mail address would have been saved with the network message. The e-mail address may then be used as the token provided back to the server computing system to enable efficient resolution into a corresponding recipient (assuming that there are not entries for the recipient in multiple databases).

Seventh, in one optional embodiment, when an input resolution data entry is ambiguous and has multiple matches, a token may be returned for each match, instead of a certificate per match. Since the token is a much smaller structure than the certificate, network bandwidth is preserved. Also since this token uniquely identifies the recipient entry, the certificate can be retrieved very efficiently when the token is provided back to the server computing system.

Eighth, distribution list expansion may be performed by the server computing system. The server computing system can often do this much more efficiently than the client, and may even cache the results. This allows less sophisticated client computing systems to be able to send encrypted e-mail to distribution lists since the client does not need to implement the complex process of distribution list expansion.

Accordingly, a unique mechanism has been described in which processing and network bandwidth efficiencies are obtained by concurrently performing recipient resolution and certificate acquisition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by the United States Letters Patent is:

1. In a network environment including a sending client computing system that is capable of transmitting network messages to each of a plurality of potential recipient client computing systems, the network environment also including a server computing system that is network connectable to the sending client computing system, a method for the server computing system to concurrently perform recipient resolution, in which at least one desired recipient is determined from a plurality of potential recipients, and certificate acquisition, in which information is obtained for encryption of a network message in a fashion that may be decrypted by a computing system of the at least one desired recipient and not by computing systems of other potential recipients, the method comprising steps of:

receiving a first request from the sending client computing system, the first request including a search string input by a user of the sending client computing system for a search of recipient entries, and further requesting that the server computing system resolve the search string into an associated recipient entry;

determining that the search string is ambiguous and cannot be resolved into a single associated recipient entry without further input from the user of the sending client computing system;

identifying a plurality of different possible recipient entries that correspond to the ambiguous search string;

for each of at least some of the plurality of different possible recipient entries, generating a token that uniquely identifies the possible recipient entry;

sending each of the generated tokens to the sending client computing system to allow the user of the sending client computing system to select, from among the plurality of different possible recipient entries, a particular recipient entry corresponding to the at least one desired recipient;

receiving a subsequent request from the sending client computing system, the subsequent request identifying a selected particular recipient entry of the plurality of different possible recipient entries using at least part of the token associated with the selected particular recipient entry;

acquiring a certificate associated with the selected particular recipient entry using information from the at least part of the token; and sending the certificate to the sending client computing system.

2. A method in accordance with claim 1, further comprising the following after determining that the search string is ambiguous and cannot be resolved into a single associated recipient entry without further input from the user of the sending client computing system, and before sending the generated tokens to the sending client computing system:

notifying the sending client computing system that the search string cannot be resolved; and receiving a second request from the sending client computing system to resolve the search string, wherein the second request was transmitted by the sending client computing system in response to having received the notification.

3. A method in accordance with claim 1, wherein the token includes an identifier that uniquely identifies a recipient entry in an organizational database.

4. A method in accordance with claim 1, wherein the token includes an identifier that uniquely identifies a recipient entry in a personal database.

5. A method in accordance with claim 1, wherein the token includes a routing address associated with a corresponding recipient entry.

6. A method in accordance with claim 1, wherein the first and subsequent requests are each HyperText Transport Protocol (HTTP) requests.

7. A method in accordance with claim 1, wherein identifying a plurality of different possible recipient entries comprises the following:

querying an organization database for recipient entries using the search string.

8. A method in accordance with claim 7, further comprising the following:

receiving a result of the query;

determining that the result of the query indicates that no matching recipient entries were found; and querying a personal database using the search string.

9. A method in accordance with claim 1, wherein identifying a plurality of different possible recipient entries comprises the following:

querying a personal database using the search string.

10. A method in accordance with claim 1, wherein the selected particular recipient entry does not correspond to a distribution list.

11. A method in accordance with claim 10, wherein the certificate does not include validation information.

12. A method in accordance with claim 1, wherein the selected particular recipient entry is a distribution list that includes a plurality of member recipients.

13. A method in accordance with claim 12, wherein the certificate includes a single certificate for the entire distribution list.

14. A method in accordance with claim 12, wherein the certificate comprises a plurality of certificates, each corresponding to one of the member recipients.

15. A method in accordance with claim 12, further comprising the following:

receiving a second request from the sending client computing system, the second request being for resolution to occur for at least one of the identified member recipients associated with the distribution list;

resolving the identified member recipients into a resolved member recipient entry; and generating a second response to the second request, the second response including information from the resolved recipient entry.

16. A method in accordance with claim 1, further comprising the following:

validating the certificate prior to transmitting the certificate to the sending client computing system.

17. A computer program product for use in a network environment including a sending client computing system that is capable of transmitting network messages to each of a plurality of potential recipient client computing systems, the network environment also including a server computing system that is network connectable to the sending client computing system, the computer program product comprising one or more computer-readable storage media having thereon computer-executable instructions that, when executed by one or more processors of the server computing system, cause the server computing system to implement a method for the server computing system to concurrently perform recipient resolution, in which at least one desired recipient is determined from a plurality of potential recipients, and certificate acquisition, in which information is obtained for encryption of a network message in a fashion that may be decrypted by a computing system of the at least one desired recipient and not by computing systems of other potential recipients, the method comprising steps of:

receiving a first request from the sending client computing system, the first request including a search string input by a user of the sending client computing system for a search of recipient entries, and further requesting that the server computing system resolve the search string into an associated recipient entry;

determining that the search string is ambiguous and cannot be resolved into a single associated recipient entry without further input from the user of the sending client computing system;

identifying a plurality of different possible recipient entries that correspond to the ambiguous search string;

for each of at least some of the plurality of different possible recipient entries, generating a token that uniquely identifies the possible recipient entry;

sending each of the generated tokens to the sending client computing system to allow the user of the sending client computing system to select, from among the plurality of different possible recipient entries, a particular recipient entry corresponding to at least one desired recipient;

receiving a subsequent request from the sending client computing system, the subsequent request identifying a selected particular recipient entry of the plurality of different possible recipient entries using at least part of the token associated with the selected particular recipient entry;

acquiring a certificate associated with the selected particular recipient entry using information from the at least of the token; and sending the certificate to the sending client computing system.

18. A computer program product in accordance with claim 17, wherein the one or more computer-readable storage media is volatile system memory.

19. A computer program product in accordance with claim 17, wherein the one or more computer-readable storage media is non-volatile.

20. A computer program product in accordance with claim 17, wherein the one or more computer-readable storage media further have thereon computer-executable instructions that, when executed by the one or more processors, cause the server computing system to perform the following after determining that the second input data cannot be resolved into a single associated recipient entry without further input from the client computing system, and before communicating the generated tokens to the client computing system:

notifying the sending client computing system that the search string cannot be resolved; and receiving a second request from the sending client computing system to resolve the search string, wherein the second request was transmitted by the sending client computing system in response to having received the notification.

21. A computer program product in accordance with claim 17, wherein the one or more computer-readable storage media further have thereon computer-executable instructions that, when executed by the one or more processors, cause the server computing system to perform the following:

validating the certificate prior to transmitting the certificate to the client computing system.

* * * * *